Sept. 18, 1923.  H. F. RIOPELLE  1,468,079
ILLUMINATED MOTOR VEHICLE SIGNAL
Filed March 18, 1921
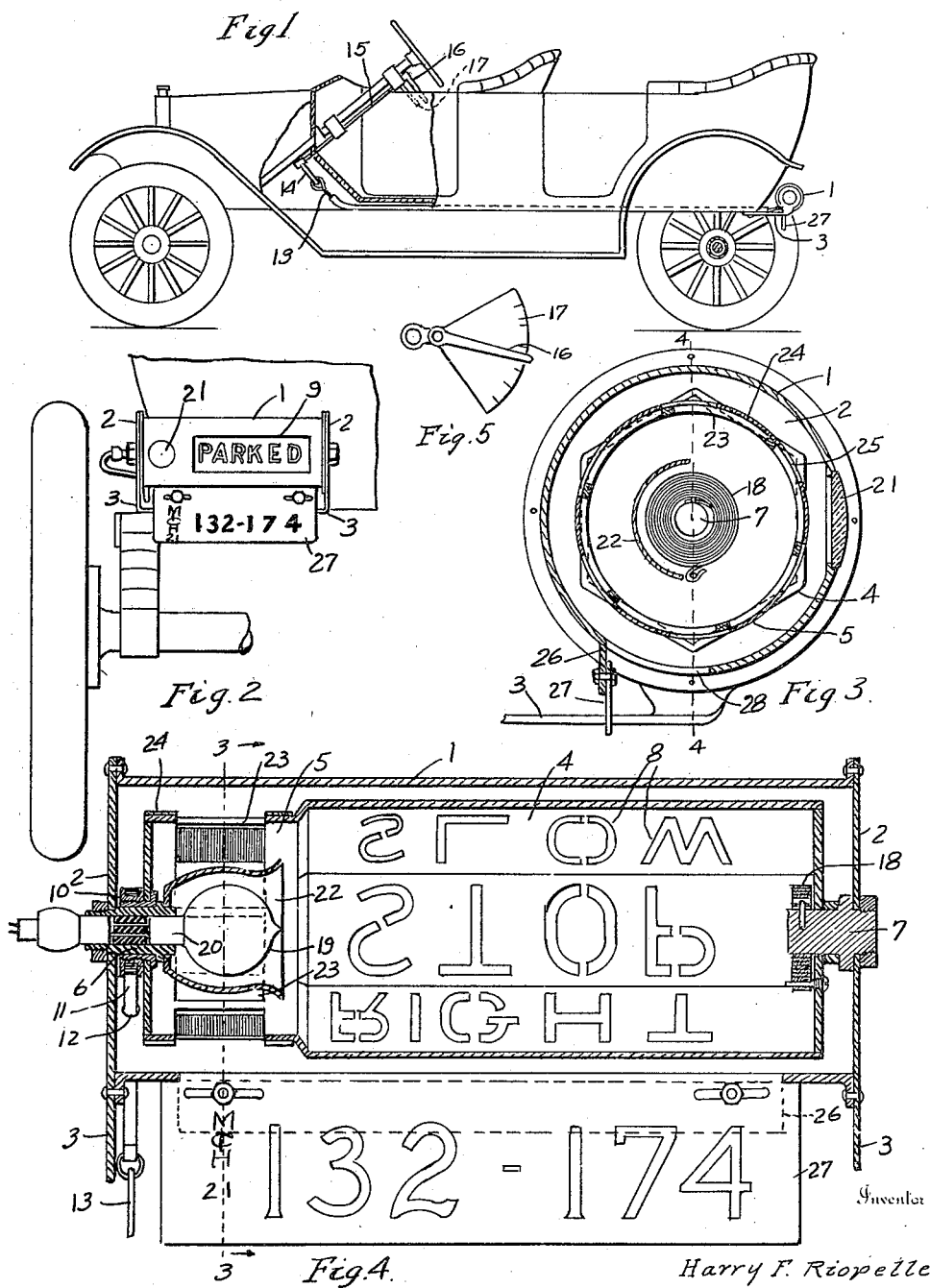
Inventor
Harry F. Riopelle
By B. F. Wheeler
Attorney Patented Sept. 18, 1923.

1,468,079

UNITED STATES PATENT OFFICE.

HARRY F. RIOPELLE, OF DETROIT, MICHIGAN.

ILLUMINATED MOTOR-VEHICLE SIGNAL.

Application filed March 18, 1921. Serial No. 453,321.

*To all whom it may concern:*

Be it known that I, HARRY F. RIOPELLE, a citizen of the United States, residing at Detroit, in the county of Wayne and State of Michigan, have invented a new and useful Illuminated Motor-Vehicle Signal, of which the following is a specification.

This invention relates to motor vehicle signals and more particularly to illuminated signals for use at the rear of a motor vehicle to indicate the intention of the driver of the vehicle.

It is the object of the invention to provide a signal comprising a series of changeable signs controlled from the driver's seat and arranged to be illuminated at night, and to attract the attention of drivers at the rear of a vehicle thus equipped by a momentary change of color or other variation of the light just previous to a change of the exposed sign.

The invention further consists in various structural features hereinafter fully described and illustrated in the accompanying drawing, wherein, Fig. 1 is a view in side elevation of a motor vehicle equipped with the improved signal and disclosing primarily the controlling means for said signal.

Fig. 2 is a fragmentary rear view of a motor vehicle, showing the location of the signal thereupon.

Fig. 3 is a view of the signal in cross-section, the section being taken upon line 3—3 of Fig. 4.

Fig. 4 is a longitudinal vertical sectional view taken on line 4—4 of Fig. 3.

Fig. 5 is a detail view of an index and latch plate which is associated upon the steering column of the vehicle with the control lever of the signal.

In these views, the reference character 1 designates a cylindrical casing formed preferably of sheet metal and having its end plates 2 integrally formed with projections 3, functioning as brackets to secure the casing to the rear end of a motor vehicle (see Fig. 1). Within said casing there is rotatively mounted a hollow indicating member, the major portion of which is hexagonal as indicated at 4, but which has a cylindrical portion 5 adjacent one end. The last mentioned end of the indicating member is journaled upon a tubular pivot pin 6 projecting rigidly and centrally inward from the corresponding end 2 of the outer casing. An alined pivot pin 7 projecting rigidly inward from the other end wall of the outer casing forms a pivotal support for the corresponding extremity of the indicating member. The hexagonal walls of the indicating member are respectively apertured as indicated at 8 to form a series of signs which are individually registrable through rotation of said member with a window 9 facing rearwardly in the outer casing 1. Said signs are of a nature to indicate the intentions of the driver in starting, stopping, parking, and varying the speed or direction of his vehicle. Control of the indicating member from the driver's seat is established by securing a drum 10 to the end of said member which engages the tubular pivot 6, and attaching to said drum a flexible band 11 passing through an opening 12 in the casing 1 and connected by a wire 13 with a rock arm 14 upon the lower end of a control stem 15 journaled upon the steering column 15. Upon the upper end of said stem, within easy reach of the driver, there is secured a handle 16, which is associated with a segmental index and latch plate 17 stationary upon the steering column. Said plate is adapted to hold the handle 16 in any of a number of selective positions of angular adjustment, in which positions the signs 8 are individually displayed through the window 9. Rotation of the indicating member 4 in one direction is effected by exerting a pull upon the cord 13, by means of the handle 16, and thereby winding the band 11 off of the drum 10. Reverse rotation of the indicating member is actuated by a spring 18 coiled upon the pivot member 7 and secured at its extremities respectively to said pivot and to the adjacent end of the indicating member.

For the purpose of illuminating the signs 8 at night there is centrally arranged within the end portion 5 of the indicating member an electric light bulb 19 having its terminal end 20 secured within the inner end of the tubular pivot 6. Said bulb is further adapted to illuminate a bull's eye 21 fitting an opening in the casing 1, alined rearwardly with said bulb, the radiation through said bull's eye being increased by the provision of a concave reflector 22 adjacent to said bulb in front thereof, the pivot member 6 being employed as a support for said reflector. To permit illumination of said bull's eye by the bulb it is necessary to form windows 23 in the part 5, respectively registering with said bulb in the various positions of adjustment of the indicating member. Embracing the portion 5 of the indicating member is a transparent sheet 24 of red material, as for example celluloid, having openings 25 therein each registering with a substantial portion of one of the windows 23.

The described arrangement is such that in any of the positions of adjustment of the indicating member the rays illuminating the bull's eye are compelled to pass throug the member 24 and are thus colored red. When, however, the displayed sign 8 is being changed, one or more of the openings 25 in said member 24 are momentarily registered with the bull's eye so that a flash or succession of flashes of white light through the bull's eye must occur preliminary to a change of the displayed sign. It is preferred to strike out of the bottom of the casing 1 a depending tongue 26, to be used as a support for a license plate 27, the opening 28 from which said tongue is struck permitting illumination of said plate at night.

From the preceding description it is seen that the one bulb 19 serves a triple function in illuminating the displayed sign 8, the bull's eye 21 and the license plate 27. Said bull's eye, being normally illuminated by red light, provides the danger signal which is required by law and is furnished usually by an ordinary tail-light. The described flashes of white light emanating from said bull's eye preliminary to a change of the signs 8, serve the purpose of attracting the attention of the drivers of vehicles following the vehicle equipped with the described signal, so that the change of sign will be observed by such drivers. The mounting of the control handle 16 upon the steering column allows the driver to very readily exercise control of the signal, and the index plate 17 forms a simple provision for informing the driver as to the proper position of the handle to secure a described adjustment of the indicating member.

What I claim is:

1. In a motor vehicle signal, the combination with a stationary casing, having a window opening, of a hollow indicating member rotative within the first mentioned casing and apertured to form signs individually registrable with said window in selective positions of rotative adjustment of said member, a lamp arranged within the indicating member to illuminate the sign registered with said window, a bull's eye in the casing illuminated by said light, and means for effecting a pronounced variation of the illumination of said bull's eye through rotative adjustment of said indicating member to attract attention to the signal preliminary to a change of sign.

2. In a motor vehicle signal, the combination with a stationary casing having a window opening, of a hollow indicating member rotative within the first mentioned casing and apertured to form signs individually registrable with said window in selective positions of rotative adjustment of said member, a lamp arranged within the indicating member to illuminate the sign registered with said window, a bull's eye in the casing illuminated by said light, and means for varying the color of the light illuminating said bull's eye during rotative adjustment of said indicating member to attract attention to the signal preliminary to a change of sign.

3. In a motor vehicle signal, the combination with a stationary casing having a window opening, of a hollow indicating member rotative within the first mentioned casing and apertured to form signs individually registrable with said window in selective positions of rotative adjustment of said member, a lamp arranged within the indicating member to illuminate the sign registered with said window, a bull's eye in the casing illuminated by said light, and a transparent colored member through which the rays illuminating the bull's eye normally pass, acquiring the color of said member, and means for shifting said member through rotative adjustment of the indicating member to permit the light to reach the bull's eye without change of color.

4. In a motor vehicle signal, the combination with a stationary casing having a window opening, of a bull's eye in an end portion of said casing, an indicating member rotative within the first mentioned casing and having a circumferentially spaced series of signs registrable individually with said window through rotative adjustment of said indicating member and formed with a corresponding circumferentially spaced series of windows individually registrable with said bull's eye, a lamp within said indicating member in registration with said bull's eye, and a transparent colored member partially covering said windows of the indicating member normally interposing some one of said portions between the light and said bull's eye and temporarily registering one or more of its apertures with said bull's eye when the indicating member is rotatively adjusted.

5. In a motor vehicle signal, the combination with a stationary casing having a window opening, of a bull's eye in said casing, a lamp in said casing substantially opposite said bull's eye, a hollow indicating member rotative within said casing and having signs individually registrable with said opening in selective rotative positions of said member, said indicating member having at one end an extension surrounding said lamp and adapted to vary the illumination of said bull's eye by the light upon rotative adjustment of the indicating member, and means operable from the driver's seat of the vehicle for rotating the indicating member to selectively register said signs with said window opening.

In testimony whereof I sign this specification.

HARRY F. RIOPELLE.